United States Patent
Chen et al.

(10) Patent No.: US 9,210,483 B2
(45) Date of Patent: Dec. 8, 2015

(54) METHOD AND APPARATUS FOR WATERMARKING AN AC-3 ENCODED BIT STREAM

(71) Applicant: THOMSON LICENSING, Issy de Moulineaux (FR)

(72) Inventors: Xiaoming Chen, Hannover (DE); Peter Georg Baum, Hannover (DE); Michael Arnold, Isernhagen (DE); Ulrich Gries, Hannover (DE)

(73) Assignee: Thomson Licensing, Issy-les-Moulineaux (FR)

( * ) Notice: Subject to any disclaimer, the term of this patent is extended or adjusted under 35 U.S.C. 154(b) by 58 days.

(21) Appl. No.: 13/928,142

(22) Filed: Jun. 26, 2013

(65) Prior Publication Data
US 2014/0006790 A1     Jan. 2, 2014

(30) Foreign Application Priority Data
Jun. 28, 2012   (EP) ..................................... 12305760

(51) Int. Cl.
| | |
|---|---|
| H04L 9/32 | (2006.01) |
| H04N 21/845 | (2011.01) |
| G10L 19/018 | (2013.01) |
| G10L 19/02 | (2013.01) |
| G10L 19/035 | (2013.01) |

(52) U.S. Cl.
CPC ............ *H04N 21/845* (2013.01); *G10L 19/018* (2013.01); *G10L 19/0212* (2013.01); *G10L 19/035* (2013.01)

(58) Field of Classification Search
CPC H04N 21/845; G10L 19/018; G10L 19/0212; G10L 19/035
USPC .......................................................... 713/176
See application file for complete search history.

(56) References Cited

U.S. PATENT DOCUMENTS

| 8,078,301 B2 | 12/2011 | Srinivasan |
| 2004/0028281 A1 | 2/2004 | Cheng et al. |

(Continued)

FOREIGN PATENT DOCUMENTS

| EP | 1104969 | 6/2001 |
| EP | 2175444 | 4/2010 |

(Continued)

OTHER PUBLICATIONS

Digital Audio Compression Standard (AC-3, E-AC-3), published by Advanced Television Systems Committee, Inc, Nov. 22, 2010.*

(Continued)

*Primary Examiner* — Nirav B Patel
*Assistant Examiner* — Mohammed Waliullah
(74) *Attorney, Agent, or Firm* — Myers Wolin LLC

(57) ABSTRACT

For watermark embedding, without full Dolby AC-3 decoding, mantissa bits in the AC-3 bit stream are changed by exploiting the fact that during AC-3 encoding more bits than required by the perceptual masking curve are used for the quantization of the MDCT coefficient mantissa values. In addition to the bap values, truly required bap values are determined and the mantissa values are changed accordingly, controlled by the watermark information. The advantages are efficient watermark embedding, other bit stream parameters and values remain unchanged except for CRC checks, and the audio quality of the watermarked signal remains perceptually unchanged.

11 Claims, 4 Drawing Sheets

(56) References Cited

U.S. PATENT DOCUMENTS

| | | | |
|---|---|---|---|
| 2008/0091288 | A1 | 4/2008 | Srinivasan |
| 2009/0063159 | A1* | 3/2009 | Crockett .................. 704/500 |
| 2009/0070587 | A1* | 3/2009 | Srinivasan et al. ............ 713/176 |
| 2010/0046795 | A1 | 2/2010 | Srinivasan |

FOREIGN PATENT DOCUMENTS

| | | |
|---|---|---|
| WO | WO2005008582 | 1/2005 |
| WO | WO2007031423 | 3/2007 |

OTHER PUBLICATIONS

Search Rept: Oct. 5, 2012.
Arnold et al., "A Phase Modulation Audio Watermarking Technique", Lecture Notes in Computer Science, vol. 5806, 2009, pp. 102-116.
Peng et al., "A semi-fragile watermarking algorithm for authenticating 2D CAD engineering graphics based on log-poloar transformation", Journal of Computer Aided Design, vol. 42, 2010, pp. 1207-1216.
Anonymous, "Digital Audio Compression Standard (AC-3, E-AC-3)", Advanced Television Systems Committee, Inc., Washington, D.C., Nov. 22, 2010, pp. 1-84.
Kim et al., "Additive data insertion into MP3 bitstream using linbits characteristics", IEEE International Conference on Acoustics, Speech, and Signal Processing 2004, Montreal, Quebec, Canada, May 17, 2004, pp. 181-184.
Cheng et al., "Enhanced spread spectrum watermarking of MPEG-2 AAC audio", IEEE International Conference on Acoustics, Speech, and Signal Processing 2002, Orlando, Florida, USA, May 13, 2002, pp. 3728-3731.
Kirbiz et al., "Decode-time forensic watermarking of AAC bitstreams", IEEE Transactions on Information Forensics and Security, vol. 2, No. 4, Dec. 2007, pp. 683-696.
Siebenhaar et al., "Combined compression/Watermarking for audio signals", Audio Engineering Society Convention 110, May 1, 2001, pp. 1-10.
Chen et al., "Efficient coherent phase quantization for audio watermarking", IEEE International Conference on Acoustics, Speech, and Signal Processing, Prague, Czech Republic, May 22, 2011, pp. 1844-1847.
Kabal, "An examination and interpretation of ITU-R BS.1387: Perceptual evaluation of audio quality", McGill University, Technical Report, Version 2, Dec. 8, 2003, pp. 1-96.
Neubauer et al., "Audio watermarking of MPEG-2 AAC bit streams", 108th Audio Engineering Society Convention, Paris, France, Feb. 19, 2000, pp. 1-20.
Wang et al., "Robust AVS audio watermarking", Science China and Information Sciences, vol. 57, No. 3, Mar. 2010, pp. 607-618.
Qiao et al., "Non-invertible watermarking methods for mpeg encoded audio", Proceedings of the SPIE, vol. 3675, Security and Watermarking of Multimedia Contents, Jun. 25, 1998, pp. 194-202.
Neubauer et al., "Advanced watermarking and its applications", 109th Audio Engineering Society Convention, Los Angeles, California, USA, Sep. 22, 2000, pp. 1-20.
Davidson, " Chapter 41—Digital Audio Coding: Dolby AC-3", The Digital Signal Processing Handbook. CRC Press LLC, New York, 1999, pp. 1-23.
Davidson et al., "Parametric bit allocation in a perceptual audio coder", 97th Audio Engineering Society Convention, San Francisco, California, USA, Nov. 10, 1994, pp. 1-21.
Arnold et al., "Improving Tonality Measures for Audio Watermarking", Proceedings of the Information Hiding Workshop, Lecture Notes in Computer Science, vol. 6958, May 18, 2011, pp. 223-237.
Arnold et al., "Robust detection of audio watermarks after acoustic path transmission", Proceedings of the 12th ACM workshop on Multimedia and Security, Rome, Italy, Sep. 9, 2010, pp. 117-126.
Ruggles, "Afen: A/52 audio encoder", http://aften.sourceforge.net , Jan. 1, 2007, pp. 1-2.
Anonymous, "Sound Quality Assessment Material Recordings for Subjective Tests," Technical Centre of the European Broadcasting Union, Geneva, Switzerland, Sep. 2008, pp. 1-13.

* cited by examiner

US 9,210,483 B2

METHOD AND APPARATUS FOR WATERMARKING AN AC-3 ENCODED BIT STREAM

FIELD OF THE INVENTION

This application claims the benefit, under 35 U.S.C. §119 of European Patent Application 12305760.6, filed Jun. 28, 2012.

The invention relates to a method and to an apparatus for watermarking an AC-3 encoded bit stream by modifying mantissa values.

BACKGROUND OF THE INVENTION

Dolby AC-3 (adaptive transform coder 3) is a well-known audio compression format, which is used e.g. in cinema, DVD, BD and digital television applications.

In WO 2005/008582 A2 a watermark embedding for an AC-3 bit stream is disclosed that is performed by directly changing mantissa bits in the bit stream. For deriving the reference mantissas the bit stream is decompressed to a PCM signal, followed by PCM watermarking and an MDCT transform required for deriving watermarked MDCT coefficients, which finally deliver the required reference mantissas for modifying the mantissa bits in the bit stream.

SUMMARY OF THE INVENTION

However, this kind of reference mantissa generation is relatively complicated, limiting its deployment for real-time applications like in digital home networks or for video-on-demand. Moreover, no psycho-acoustic constraint is taken into account during the mantissa modification, possibly resulting in perceptual distortions.

A problem to be solved by the invention is to provide an efficient way for watermark embedding in an AC-3 bit stream, thereby maintaining the audio perceptual transparency.

According to the invention, for watermark embedding, without full AC-3 decoding, MDCT coefficient mantissa bits in the AC-3 bit stream are changed by exploiting the fact that during AC-3 encoding more bits than required by the perceptual masking curve are used for the quantization of the mantissa values.

For low bit rate AC-3 streams such watermark information embedding may not be possible due to small or even negative SNR-offset values. On the other hand it is questionable whether it makes sense to watermark such low bit rates and, if true, further degradation of the audio quality is probably not a problem.

The advantages of the inventive processing are:
efficient watermark embedding;
other parameters and values (except for CRC checks) in the bit stream remain unchanged and reference mantissas are generated directly independent of the embedding process;
the audio quality of the watermarked signal remains perceptually unchanged and the perceptual transparency is kept;
low complexity because the AC-3 stream does not need to be fully decoded, watermarked with a PCM watermarking procedure and encoded again to get a watermarked AC-3 stream, which may result in a further degradation of the quality.

In principle, the inventive method is suited for watermarking an AC-3 encoded bit stream, said method comprising:

partially decoding said AC-3 encoded bit stream, thereby providing original quantized mantissa values and exponent values derived from MDCT transform coefficients and bap values for said mantissa values, and determining the corresponding PSD values from said exponent values and determining from said PSD values the resulting masking curve;
determining from said masking curve and said PSD values truly required bap values denoted as bap_t values;
determining from said original mantissa values, said bap values and said bap_t values a maximum allowable mantissa value modification for a current mantissa and, if applicable, limiting a desired value for said current mantissa by said maximum allowable mantissa value modification, wherein said desired mantissa value is received from a watermarking processing;
changing the original AC-3 mantissa bits for a current mantissa value according to said limited desired mantissa value.

In principle the inventive apparatus is suited for watermarking an AC-3 encoded bit stream, said apparatus comprising:
means for partially decoding said AC-3 encoded bit stream, thereby providing original quantized mantissa values and exponent values derived from MDCT transform coefficients and bap values for said mantissa values, and for determining the corresponding PSD values from said exponent values and for determining from said PSD values the resulting masking curve;
means for determining from said masking curve and said PSD values truly required bap values denoted as bap_t values;
means for determining from said original mantissa values, said bap values and said bap_t values a maximum allowable mantissa value modification for a current mantissa and, if applicable, for limiting a desired value for said current mantissa by said maximum allowable mantissa value modification, wherein said desired, mantissa value is received from a watermarking processing;
means for changing the original AC-3 mantissa bits for a current mantissa value according to said limited desired mantissa value.

BRIEF DESCRIPTION OF THE DRAWINGS

Exemplary embodiments of the invention are described with reference to the accompanying drawings, which show in.

DETAILED DESCRIPTION

Figure 1:
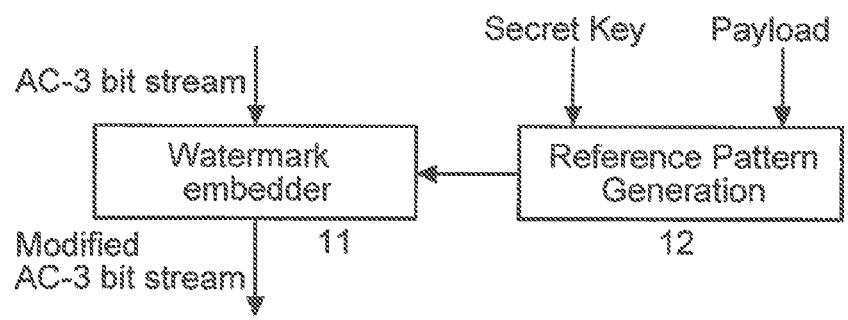
FIG. 1 simplified block diagram for watermark embedding in an AC-3 bit stream.

Principle of AC-3 codec for a Single Full-Bandwidth Channel
For AC-3 encoding an input audio signal is divided into overlapping blocks, each of which is weighted by a window function, denoted as windowing-overlapping WOL. Thereafter each weighted block is transformed to the frequency domain by means of a modified discrete cosine transform MDCT. The AC-3 codec quantizes the MDCT coefficients and delivers the quantized MDCT coefficients in the bit stream. At AC-3 decoder side, an inverse MDCT transform IMDCT is applied to corresponding blocks of quantized MDCT coefficients extracted from the AC-3 bit stream in order to get time-domain data blocks. After a corresponding windowing-overlap-add WOLA process, the decoded audio signal is recovered.

Instead of transmitting quantized MDCT coefficients directly, each AC-3 MDCT coefficient is basically represented by a mantissa-exponent format: $X[k]=m[k]2^{-e[k]}$, where $m[k]$ is the mantissa of $X[k]$ and $e[k]$ is the exponent. The exponent $e[k]$ is a non-negative integer and the mantissa $m[k]$ belongs to $\{[-1,-0.5)\cup 0\cup(0.5,1]\}$. Before mantissa quantization, MDCT coefficients are pre-processed:

Exponents greater than 24 are truncated to 24;

For compression, exponents are shared between 1, 2 or 4 adjacent MDCT coefficients. Accordingly, mantissas sharing the same exponent are selectively scaled. For example, $m[k-1]2^{-2}, m[k]2^{-3}$ denote two MDCT coefficients before exponent sharing. The second mantissa is scaled to $m[k]2^{-3} \rightarrow (m[k]2^{-1})2^{-2}$, i.e. it is scaled by $2^{-1}$;

Differential exponents are evaluated while limiting the difference to $\{0,\pm 1,\pm 2\}$.

For example, $m[k-1]2^{-2}, m[k]2^{-7}$ denote two MDCT coefficients where the exponent difference is $e[k-1]-e[k]=5$. In order to get a difference value in the set $(0,\pm 1,\pm 2)$, the second mantissa is scaled to $m[k]2^{-7} \rightarrow (m[k]2^{-3})2^{-4}$.

Therefore, following this pre-processing, the range of mantissa values is changed to $m[k]\in[-1,1]$.

For representing exponents, differential exponents and some reference exponents are used in the bit stream, for details see the AC-3 standard ATSC A/52.

From an AC-3 bit stream quantized mantissas can be derived, but instead of transmitting quantized mantissa values directly, a bit allocation pointer 'bap' and mantissa bits are assigned to each mantissa. The bap value indicates the type of quantizer used to quantize the corresponding mantissa value, and how many mantissa bits are used to represent the coded mantissa. Based on the bap value and its associated mantissa bits, the corresponding quantized mantissa value can be derived.

Moreover, the bap value also indicates how many mantissa bits are representing the quantizer level. Consequently, lo based on the bap values, the number of bits representing quantized MDCT coefficients in the bit stream can be determined. A larger bap value corresponds to a quantizing with more quantization levels, i.e. a quantizing with a higher signal-to-noise ratio of quantization SNRq.

Determination of bap Values

The determination of bap values is carried out based on $e[k]$ by the following steps:

Determining the power spectral density PSD from $e[k]$;
Calculating the masking curve;
Determining the bap values such that no audible distortion is introduced due to quantization.

More specifically, according to the PSD value and the masking threshold, the corresponding signal-to-mask ratio SMR can be evaluated, Consequently, a quantizer with SNRq≥SMR can be used for quantizing the mantissa without causing perceptual distortions. Let $bap_0$ be the least bap value resulting from SNRq≥SMR, then selecting a bap value larger than $bap_0$ will not cause any perceptual distortion.

On the other hand, given a bit rate, the number of bits in a bit stream associated to an audio signal is fixed. Therefore the final bap values should fulfill this bit budget constraint. In the AC-3 standard, an SNR-offset parameter is used to shift the original masking curve such that the bit rate constraint is satisfied, and instead of SMR alone, the sum of SMR and SNR-offset is employed to determine the actual bap values, For SNR-offset>0, an increased bap value is obtained. Conversely, SNR-offset<0 will result in a decreased bap value, which however will cause audible distortions. During the AC-3 encoding, the SNR-offset value is determined through an iterative process so that the finally determined bap values are consistent with the bit rate constraint. These final bap values and the corresponding SNR-offset values are included in the AC-3 bit stream.

An AC-3 bit stream is composed of sync frames, where each sync frame corresponds to the code for 1536 PCM samples. It includes synchronization information, bit stream information and audio blocks containing exponent and mantissa information. For error detection, two 16-bit cyclic redundancy check (CRC) words are used for each sync frame. The first CRC is employed to check the first ⅝ of the sync frame, and the second one to check the whole sync frame.

Basic Decoding Steps for a Full-Bandwidth Channel

In a received AC-3 bit stream the exponents can be calculated easily from the reference exponents and the differential exponents. After calculating the PSD values and the masking curve, the bap values are determined by taking the received SNR-offset values into account. Each bap value and its associated mantissa bits deliver a quantized mantissa and, together with the corresponding exponent values, quantized MDCT coefficients are reconstructed. Following the WOLA processing, a PCM signal is recovered.

Improved Watermark Embedder According to the Invention

A systematic overview of watermark embedding in an AC-3 bit stream is shown in FIG. 1. The AC-3 bit stream is input to a watermark embedder 11 which generates another AC-3 bit stream compatible to the AC-3 standard. A secret key and a watermark information payload are input to a watermark reference pattern generation 12 controlling embedder 11. In embedder 11, the AC-3 bit stream is modified according to the reference patterns.

Figure 2:
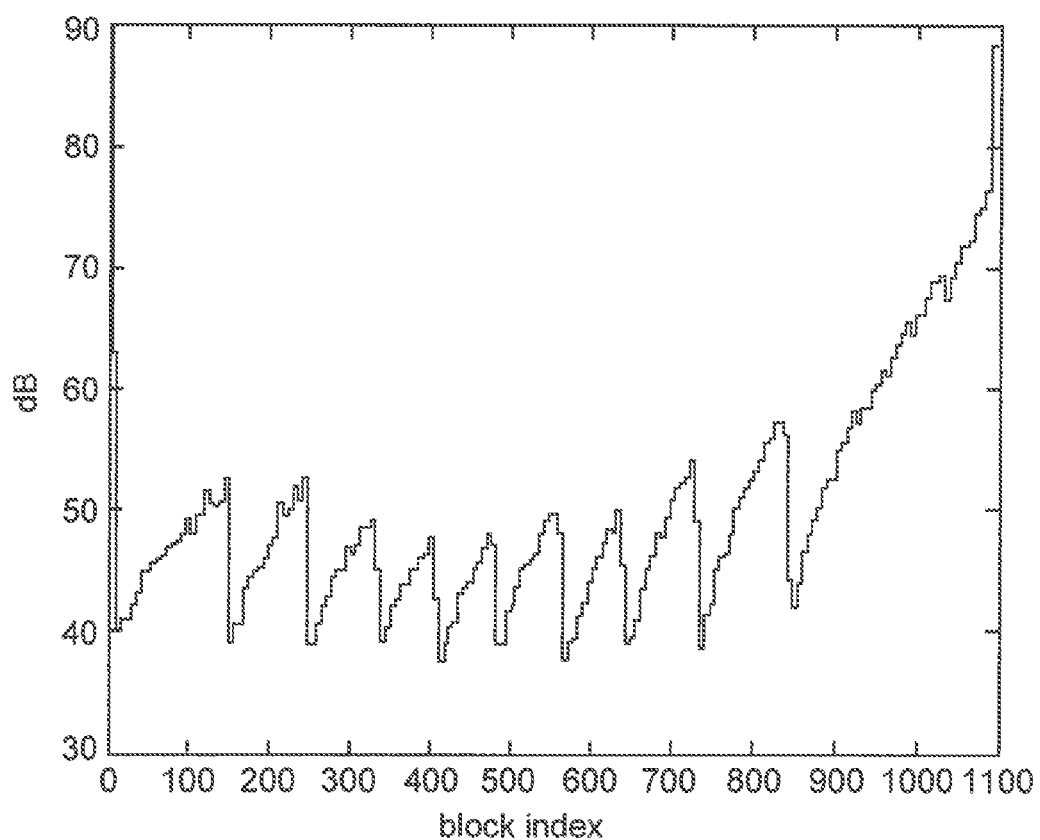
FIG. 2 example SNR-offset values of an AC-3 bit stream with 384 kbps bit rate.

As described above, bap values in the AC-3 bit stream are larger than required by the perceptual constraint if SNR-offset>0. Therefore corresponding mantissa values can be modified without causing perceptual distortions, which enables watermark information embedding. FIG. 2 shows example SNR-offset dB values of an AC-3 bit stream with 384 kbps bit rate as a function of the block index, where each block has its own SNR-offset.

Figure 3:
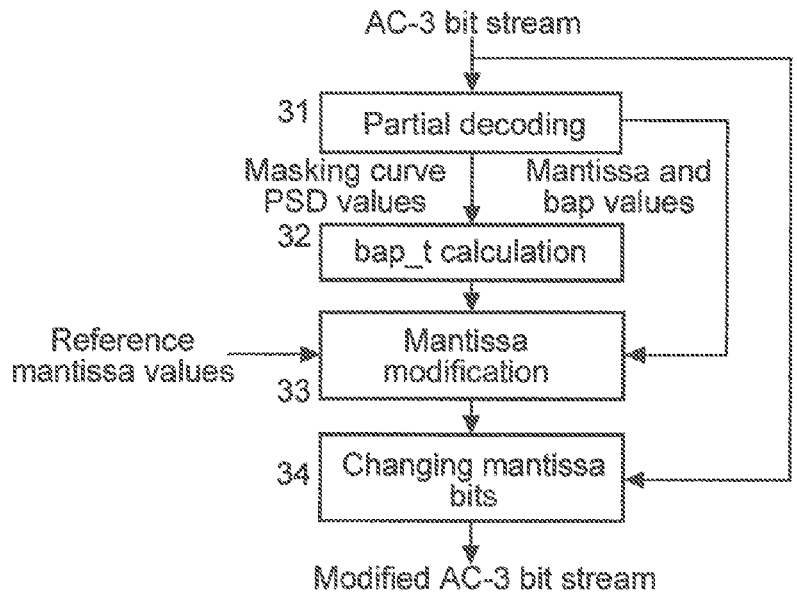
FIG. 3 inventive watermark embedding by changing mantissa bits.

The inventive watermark embedding by means of changing mantissa bits of an AC-3 bit stream is depicted. in FIG. 3. In a partial AC-3 bit stream decoding step or stage 31, the mantissa and bap values and the exponents are derived from the bit stream, the corresponding PSD values are calculated from the exponents and the resulting masking curve is determined. Such partial decoding steps are described in detail in sections 6 and 7 of the AC-3 standard.

Based on the calculated masking curve and the PSD values, the truly required. (i.e. without the 'reserve masking range' normally present in AC-3) bap values denoted as bap_t values, are determined similarly in a bap_t calculation step or stage 32 by setting SNR-offset values to zero.

Remark: if SNR-offset<0, SNR-offset can be decreased further to get bap_t<bap, in case further quality degradation is allowed.

Figure 4:
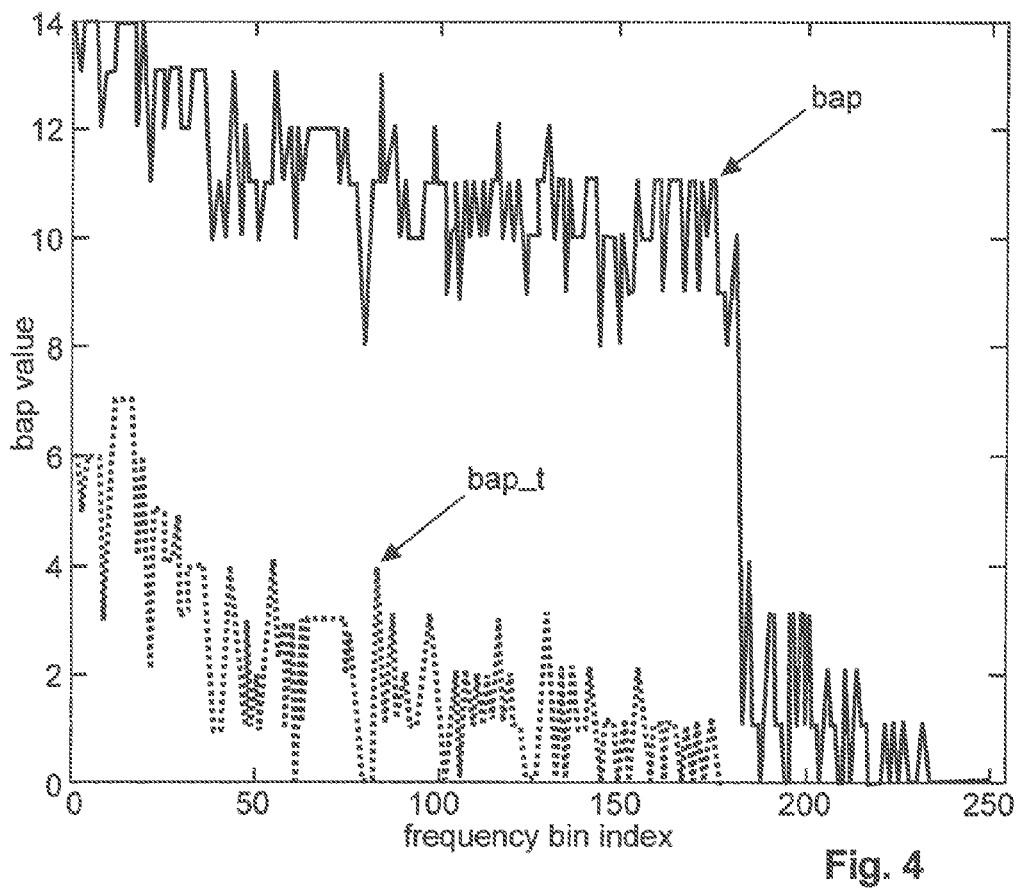
FIG. 4 comparison of bap and bap_t values for an example AC-3 bit stream.

As an example, FIG. 4 shows vs. the frequency bin index for a specific block bap values from the bit stream and the calculated bap_t values, demonstrating the possibility of watermark embedding without sacrificing the perceptual quality.

Figure 5:
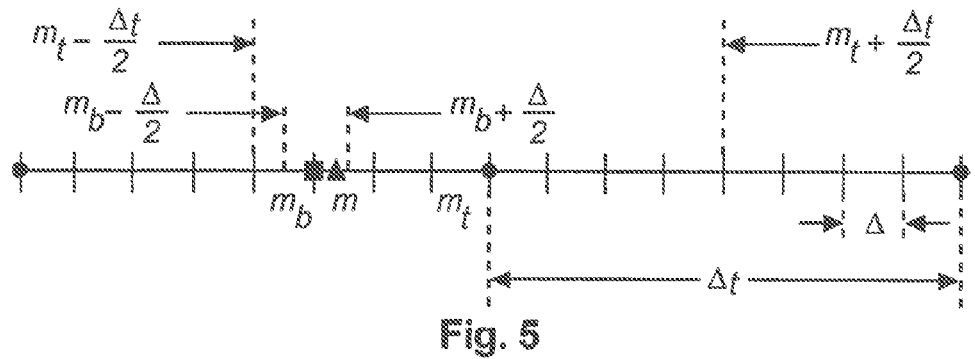
FIG. 5 quantized mantissas resulting from a finer or coarser quantize, bap>bap_t.

From the bap_t values, from the mantissa and bap values from step/stage 31, and from reference mantissa values (explained below) received from the processing or circuitry described in connection with FIG. 7, a mantissa value modification is carried out in step or stage 33, as explained in connection with FIG. 5 and FIG. 6. Finally, the original AC-3 mantissa bits are correspondingly changed in mantissa bit changing step or stage 34, based on the output of step/stage 33. Not all allowable mantissa modifications found in step/stage 33 may be used, or completely used in step/stage 34, (as explained below) because the totally available watermarking capacity may not be completely required in a current application.

Regarding allowed mantissa changes based on bit stream bap values and the corresponding calculated bap_t values, if a bap_t value is smaller than its corresponding bap value, watermark embedding is possible. The amount of allowed change is determined as depicted in FIG. 5, which shows quantized mantissas $m_b$ and $m_t$ for bap>bap_t. As mentioned above, a larger bap value means a finer quantizer, i.e. more quantization levels. In FIG. 5, the horizontal axis represents MDCT coefficient mantissa amplitude values, the short vertical lines are quantization levels '$\Delta$' indicated by, or based on, bap values and circles are quantization levels '$\Delta_t$' indicated by, or based on, bap_t values. According to the bap value in the bit stream, the original mantissa m of an MDCT coefficient is lying in the interval $m_b - \Delta/2 \leq m < m_b + \Delta/2$ and is quantized to value $m_b$. On the other hand, as explained above a coarser quantizer based on bap_t and not causing any perceptual distortion can be used, which quantizes the original mantissa value m to value $m_t$ if mantissa m is lying in the interval $m_t - \Delta_t/2 \leq m < m_t + \Delta_t/2$.

Because the maximal quantization error when using bap is $\Delta/2$ and the maximal allowed. quantization error when using bap_t is $\Delta_t/2$, the maximal allowed invention-related change for embedding becomes $\Delta_t/2 - \Delta/2$ for the quantized mantissa value $m_b$.

Thereafter, as explained below, the quantized mantissas are enlarged or decreased with respect to reference mantissas and the determined amount of allowed changes, such that the modified mantissa value is still on the grid of the finer quantizer. The term 'reference mantissa' means a desired mantissa value in view of the watermarking to be carried out. The set of such quantization levels according to current bap values is determined where the maximum difference between quantization levels in the set and $m_b$ is $\Delta_t/2 - \Delta/2$. Then the quantization level is selected within the set, which quantization level is the nearest one to the reference mantissa $m_r$.

Figure 6:
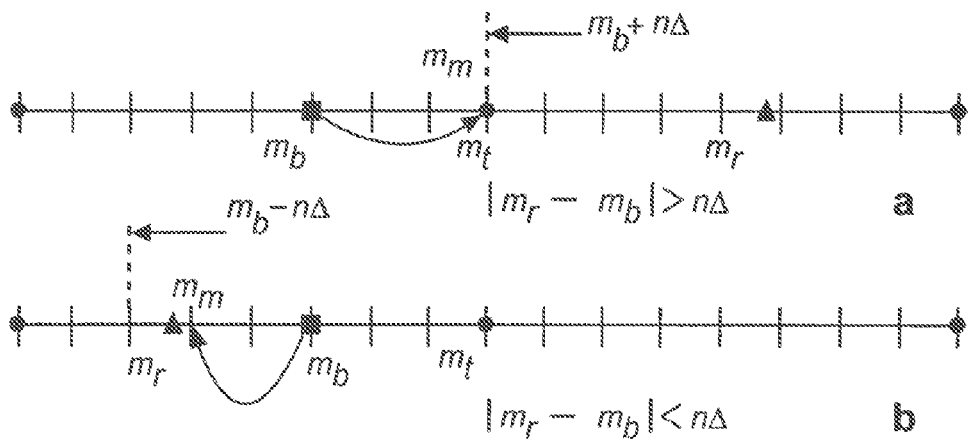
FIG. 6 modification of $m_b$.

FIG. 6 shows two corresponding examples for such mantissa modification. Like in FIG. 5, $\Delta$ is the quantization step according to the bap value. Then the maximal allowed change is determined as $n\Delta$, where $$n = \left\lfloor \frac{\Delta_t/2}{\Delta} - \frac{1}{2} \right\rfloor \text{ and } \lfloor \text{ '...' } \rfloor$$

denotes an integer value not larger than the '...' value.

Therefore, the set of allowed quantization levels will be $S=\{m_b, m_b \pm \Delta, \ldots, m_b \pm n\Delta\}$. The mantissa modification is then reduced to find the quantization level in S that has the minimum distance to a given reference mantissa value $m_r$. Accordingly, in FIG. 6a the modified mantissa value, denoted as $m_m$, will be limited and have a value $m_m = m_b + 3\Delta$, and in FIG. 6b the modified mantissa value becomes $m_m = m_b - 2\Delta$.

According to the modified mantissa values $m_m$, the original mantissa bits in the AC-3 standard bit stream are changed. Because the corresponding bap value is the same, the other parameters in the bit stream remain unchanged. Any subset of S can be employed for the mantissa modification, while fully using S enables the maximal embedding strength.

Generation of Reference Patterns

Figure 7:
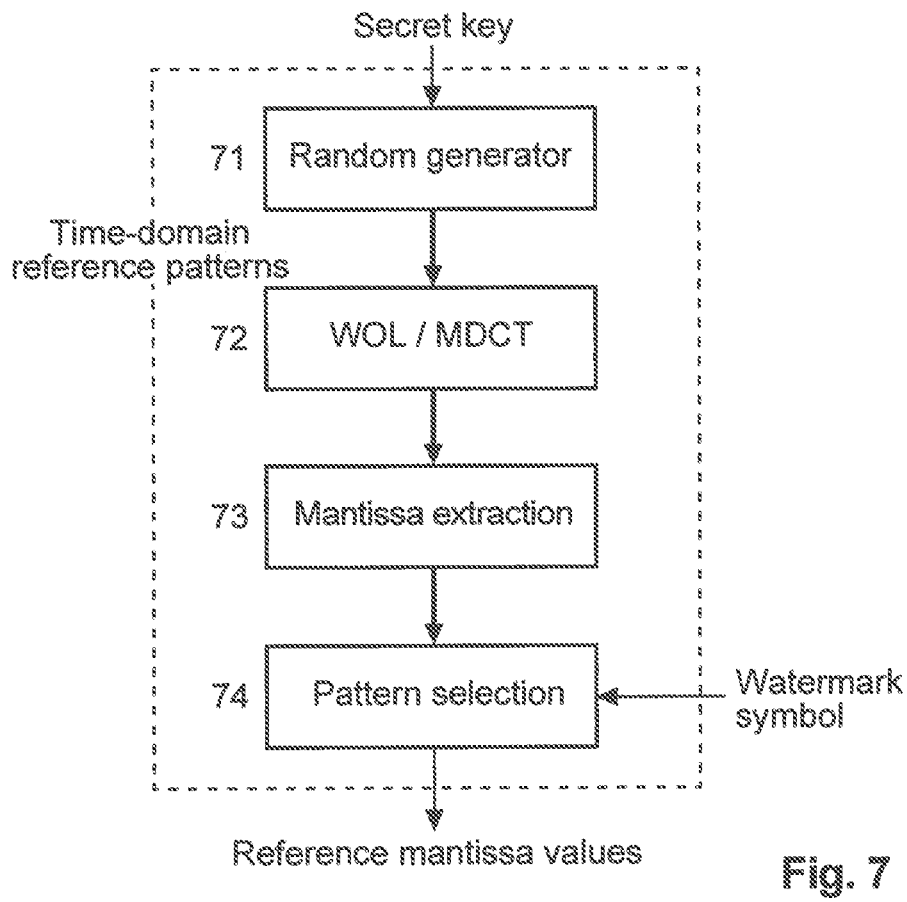
FIG. 7 generation of reference mantissas according to the invention.

Dependent on a secret key (cf. FIG. 1), $N_W$ different time domain reference patterns are generated in random generator 71 in FIG. 7, where $N_W$ denotes the alphabet size of the watermark symbols to be used. For each watermark symbol, a is time domain reference pattern of length L (for example L=16384) is randomly generated, where cross-correlation between different time domain reference patterns should be low and auto-correlation of each reference pattern has a large peak.

For each time domain reference pattern, the frequency domain reference pattern is then calculated in step/stage 72 by means of AC-3 WOL processing and MDCT transform similar as in the AC-3 encoder one time domain reference pattern is divided into overlapped blocks, and each block is weighted by a window function. Each weighted block is then transformed to the frequency domain by means of MDCT. For 50% overlapping, a block length of 512 and a reference pattern length of 16384, this results in 16128 MDCT coefficients. In step or stage 73 a current group of mantissa values obtained from the calculated MDCT coefficients is extracted. According to a current watermark information symbol, a frequency domain reference pattern is applied to the corresponding mantissa values (in this example, each symbol corresponds to 16128 mantissa values), and the resulting current reference (i.e. desired) mantissa values are used in step/stage 33 in FIG. 3 for embedding the watermark information.

Watermark Detection

Figure 8:
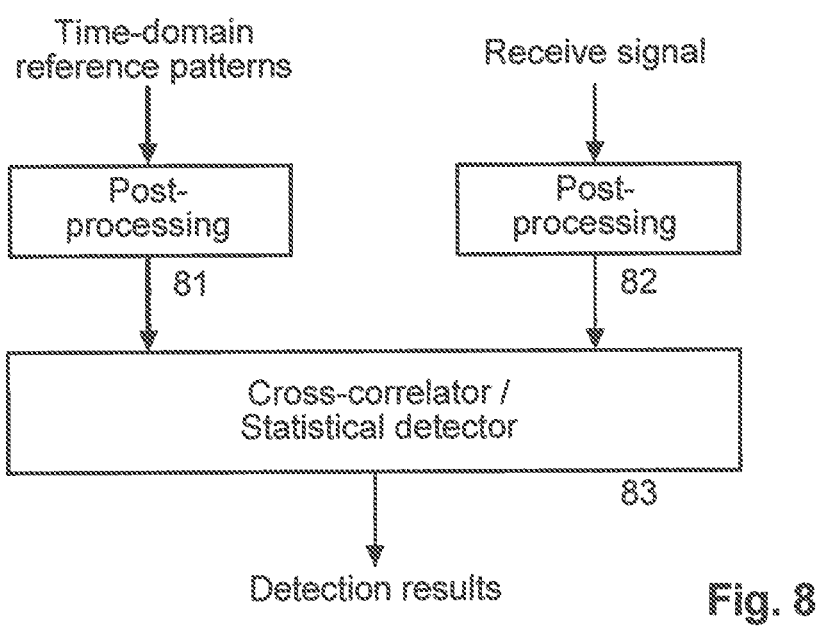
FIG. 8 watermark detection.

Watermark detection in a received watermarked signal can be carried out by means of cross-correlation as described in WO 2007/031423 A1, or by means of a statistical detector as described in EP 2175444 A1 or WO 2011/141292 A1. The set of $N_W$ different time (or frequency) domain reference patterns is stored in the watermark decoder, or is generated in the decoder by using the same key or keys as the encoder has used. In the watermark detection processing, post-processing steps like frequency range limitation or spectrum whitening may be carried out in order to generate a whitened watermarked signal and a whitened time-domain reference signal. As shown in FIG. 8, the received watermarked AC-3 signal passes through a postprocessing step or stage 82 to a cross-correlator or statistical detector 83. Candidate time domain reference patterns to be checked may also pass through a corresponding postprocessing step or stage 81 and are used in step/stage 83 for correlation with corresponding sections of the received signal, or for statistical detection. In case of a match, step/stage 83 outputs the detected corresponding watermark information.

More details can be found in M. Arnold, P. C. Baum, W. Voessing, "A phase modulation audio watermarking technique," 11th Information Hiding Workshop, pages 102-116, 2009. Consequently, a watermark detector used for PCM watermarked signals may also be used for AC-3 bit stream watermark detection. That is, the detector interoperability is maintained: the watermark can be detected, irrespective of whether it is a watermarked PCM signal or a watermarked signal with embedding occurring in the AC-3 bit stream.

The described watermark embedding processing based on changing the mantissa values can be applied to other PCM audio watermarking systems as well. The generation of the reference mantissas is based on a time-domain reference pattern dependent on the watermark symbol, which can be generated for any audio watermarking processing. In turn the embedding procedure according to FIG. 7 can be applied starting from the time-domain reference pattern. The corresponding detection algorithm for PCM watermarking can be used accordingly to the detection domain of the specific audio watermarking system.

The invention claimed is:

1. A method for watermarking a Digital Audio Compression Standard AC-3 encoded bit stream, said method comprising:
   partially decoding a Digital Audio Compression Standard AC-3 encoded bit stream, thereby providing original quantized mantissa values and exponent values derived from Modified Discrete Cosine Transform MDCT transform coefficients and AC-3 bit allocation pointer (bap) values for said original quantized mantissa values, and determining the corresponding AC-3 power spectral density PSD values from said exponent values and determining from said PSD values a resulting masking curve;
   determining from said masking curve and said PSD values truly required bap values denoted as bap_t values;
   determining from said original quantized mantissa values, said bap values and said bap_t values a maximum allowable mantissa value modification for a current mantissa and, if applicable, limiting a desired mantissa value for said current mantissa by said maximum allowable mantissa value modification, wherein said desired mantissa value is received from a watermarking processing; and
   changing the AC-3 original quantized mantissa bits for a current mantissa value according to said limited desired mantissa value,
   wherein:
   if value '$\Delta$' is a current quantization level distance based on a current bap value and '$\Delta_t$' is a current quantization level distance based on a current bap_t value, the current original quantized mantissa value m is lying in the interval $m_b-\Delta/2 \leq m < m_b+\Delta/2$ and is quantized to value $m_b$, and the current original quantized mantissa value m is lying in the interval $m_t-\Delta t/2 \leq m < m_t+\Delta t/2$ and is quantized to value $m_t$,
   the maximal allowed $m_b$ value change for embedding watermark information is $\Delta_t/2-\Delta/2$.

2. The method according to claim 1, wherein said watermarking comprises:
   random generating based on a secret key, for each watermark symbol to be available, a set of time domain reference patterns;
   calculating from said time domain reference patterns corresponding frequency domain reference patterns by carrying out an AC-3 weighted overlap-add WOL processing and MDCT transform on said time domain reference patterns;
   extracting a current group of mantissa values from the MDCT coefficients;
   based on a current watermark symbol, selecting a corresponding frequency domain reference pattern for determining a current group of desired mantissa values.

3. The method according to claim 1, wherein the value of the current mantissa is changed according to said desired mantissa value but not by more than $\Delta_t/2-\Delta/2$.

4. The method according to claim 1 wherein, following said changing of mantissa values according to said limited desired mantissa value, cyclic redundancy check CRC data in a current AC-3 sync frame are updated correspondingly.

5. An apparatus configured to watermark a Digital Audio Compression Standard AC-3 encoded bit stream, said apparatus comprising:
   memory; and
   at least one processor coupled to the memory and configured to:
      partially decode a Digital Audio Compression Standard AC-3 encoded bit stream, thereby providing original quantized mantissa values and exponent values derived from Modified Discrete Cosine Transform MDCT transform coefficients and AC-3 bit allocation pointer (bap) values for said original quantized mantissa values, and determine the corresponding AC-3 power spectral density PSD values from said exponent values and determine from said PSD values a resulting masking curve;
      determine from said masking curve and said PSD values truly required bap values denoted as bap_t values;
      determine from said original quantized mantissa values, said bap values and said bap_t values a maximum allowable mantissa value modification for a current mantissa and, if applicable, limit a desired mantissa value for said current mantissa by said maximum allowable mantissa value modification, wherein said desired mantissa value is received from a watermarking processing;
      change the AC-3 original quantized mantissa bits for a current mantissa value according to said limited desired mantissa value,
   wherein:
   if value '$\Delta$' is a current quantization level distance based on a current bap value and '$\Delta_t$' is a current quantization level distance based on a current bap_t value, the current original quantized mantissa value m is lying in the interval $m_b-\Delta/2 \leq m < m_b+\Delta/2$ and is quantized to value $m_b$, and the current original quantized mantissa value m is lying in the interval $m_t-\Delta t/2 \leq m < m_t+\Delta t/2$ and is quantized to value $m_t$,
   the maximal allowed $m_b$ value change for embedding watermark information is $\Delta_t 2-/2$.

6. The apparatus according to claim 5, wherein said watermarking comprises:
   random generating based on a secret key, for each watermark symbol to be available, a set of time domain reference patterns;
   calculating from said time domain reference patterns corresponding frequency domain reference patterns by carrying out an AC-3 weighted overlap-add WOL processing and MDCT transform on said time domain reference patterns;
   extracting a current group of mantissa values from the MDCT coefficients;
   based on a current watermark symbol, selecting a corresponding frequency domain reference pattern for determining a current group of desired mantissa values.

7. The apparatus according to claim 5, wherein the value of the current mantissa is changed according to said desired mantissa value but not by more than $\Delta_t/2-\Delta/2$.

8. The apparatus according to claim 5 wherein, following said changing of mantissa values according to said limited desired mantissa value, cyclic redundancy check CRC data in a current AC-3 sync frame are updated correspondingly.

9. A non-transitory computer readable medium with instructions stored therein which upon execution instruct at least one processor to:

partially decode a Digital Audio Compression Standard AC-3 encoded bit stream, thereby providing original quantized mantissa values and exponent values derived from Modified Discrete Cosine Transform MDCT transform coefficients and AC-3 bit allocation pointer (bap) values for said original quantized mantissa values, and determine the corresponding AC-3 power spectral density PSD values from said exponent values and determine from said PSD values a resulting masking curve;

determine from said masking curve and said PSD values truly required bap values denoted as bap_t values;

determine from said original quantized mantissa values, said bap values and said bap t values a maximum allowable mantissa value modification for a current mantissa and, if applicable, limit a desired mantissa value for said current mantissa by said maximum allowable mantissa value modification, wherein said desired mantissa value is received from a watermarking processing; and change the AC-3 original quantized mantissa bits for a current mantissa value according to said limited desired mantissa value, wherein:

if value '$\Delta$' is a current quantization level distance based on a current bap value and '$\Delta_t$' is a current quantization level distance based on a current bap_t value, the current original quantized mantissa value m is lying in the interval $m_b-\Delta/2 \leq m < m_b+\Delta/2$ and is quantized to value $m_b$, and the current original quantized mantissa value m is lying in the interval $m_t-\Delta t/2 \leq m < m_t+\Delta t/2$ and is quantized to value $m_t$, the maximal allowed $m_b$ value change for embedding watermark information is $\Delta_t/2 - \Delta/2$.

10. The non-transitory computer readable medium of claim 9, wherein the value of the current mantissa is changed according to said desired mantissa value but not by more than $\Delta_t/2 - \Delta/2$.

11. The non-transitory computer readable medium of claim 9, wherein, following said change of mantissa values according to said limited desired mantissa value, cyclic redundancy check CRC data in a current AC-3 sync frame are updated correspondingly.

* * * * *